(12) United States Patent
Vignoli (10) Patent No.: US 7,481,258 B2
(45) Date of Patent: Jan. 27, 2009

(54) DEVICE FOR TYRE DISASSEMBLING MACHINES DESIGNED TO SIMPLIFY TYRE ASSEMBLING WITHOUT EXCESSIVE STRETCHING

(75) Inventor: Giuliano Vignoli, Modena (IT)

(73) Assignee: Societa' Italiana Construzioni Elettromeccaniche- S.I.C.E.-S.p.A., Correggio (RE) (IT)

( * ) Notice: Subject to any disclaimer, the term of this patent is extended or adjusted under 35 U.S.C. 154(b) by 0 days.

(21) Appl. No.: 11/899,876

(22) Filed: Sep. 8, 2007

(65) Prior Publication Data
US 2008/0060768 A1    Mar. 13, 2008

(30) Foreign Application Priority Data
Sep. 11, 2006    (IT) .......................... MC2006A0115

(51) Int. Cl.
*B60C 25/122* (2006.01)
(52) U.S. Cl. ..................... 157/1.24; 157/1.17; 157/1.22
(58) Field of Classification Search ................ 157/1.17, 157/1.22, 1.24
See application file for complete search history.

(56) References Cited

U.S. PATENT DOCUMENTS 4,986,328 A * 1/1991 Metzger .................... 157/1.24
6,056,034 A * 5/2000 Matnick .................... 157/1.24

\* cited by examiner

*Primary Examiner*—Joseph J. Hail, III
*Assistant Examiner*—Shantese L McDonald
(74) *Attorney, Agent, or Firm*—Hodes, Pessin & Katz, P.A.

(57) ABSTRACT

The present invention relates to an improved device for tire disassembling machines in general, designed to simplify tire assembling on rim without excessive stretching.

7 Claims, 9 Drawing Sheets

DEVICE FOR TYRE DISASSEMBLING MACHINES DESIGNED TO SIMPLIFY TYRE ASSEMBLING WITHOUT EXCESSIVE STRETCHING

SUMMARY

The present invention relates to an improved device for tyre disassembling machines in general, designed to simplify tyre assembling on rim without excessive stretching.

The present patent invention relates to an improved device for tyre disassembling machines in general, designed to simplify tyre assembling on rim without excessive stretching.

The device of the invention is an improved evolutionary version of the device illustrated and described in patent EP 0 659597 B1 by the same applicant, to which reference is made for further details.

To better understand the disadvantages that are remedied by the improved device of the invention, reference must be made to the structural configuration and operating mode of the original device that is the subject of patent EP 0 659597 B1.

The latter device was designed to simplify assembling and disassembling of tyres in modern assembling/disassembling machines for car or motorcycle tyres, of the type comprising, among other things, a self-centring unit that rotates around a vertical axis designed to block the rim of the wheel, and a tyre assembling/disassembling tool, which operates between the rim border and the tyre heel and is supported by a vertical sliding rod mounted at the end of a horizontal arm that protrudes from the front of a column situated behind the self-centring unit.

The device described and illustrated in patent EP 0 659597 B1 comprises an arm with vertical articulation, formed of a first section with vertical articulation, a support element with adjustable height and a second section connected to the first section by means of an articulation provided with a heel-pressing tool; the part of the arm articulated directly to the support element is characterised by the fact that its length allows the axis of the articulation point to be placed coaxially with the rotation axis of the self-centring unit.

The heel-pressing tool is preferably composed of a roll with basically horizontal axis, such as the one described and illustrated in the Italian patent application RE95U000023 by the same applicant, to which reference is made for further details.

During the tyre assembling operation, the heel-pressing tool is positioned and pressed on the heel and on the upper side of the tyre in order to push the tyre down and maintain it in a position facing the rim channel.

When the self-centring unit is motionless, the heel-pressing tool is positioned above the part of the heel close to the assembling/disassembling tool in order to lower the articulated arm until the said part of the heel is positioned below the corresponding housing facing the central channel of the rim.

Then, the self-centring unit is rotated to drive the rim and tyre into rotation; the heel-pressing tool adheres to the tyre because of friction and rotates together with the tyre, maintaining the section of the heel that is gradually inserted under the border of the rim by the assembling/disassembling tool in front of the rim channel.

This means that, while the assembling/disassembling tool remains fixed, the tyre and the heel-pressing tool rotate jointly, driving into rotation also the second section of the arm with respect to the first fixed section.

The problems that are remedied by the present invention are generated during this assembling operation.

The said problems refer to the heavy stretching suffered by the tyre and especially the heel after the heel is inserted inside the rim channel for about half of its circle arch.

After the said insertion, the further insertion of the heel in the rim requires the energetic stretching of the heel in order to give it an elongated elliptical profile between two points, the first one in external position with respect to the rim border immediately upstream the assembling/disassembling tool, and the second one in internal position in the rim channel on the opposite side. As a matter of fact, if not opposed by the said heel-pressing tool, the second point would spontaneously tend to rise in order to move away from the centre of the rim channel and get close to the rim border.

In order to reduce the said stress, after a first 180° rotation of the heel-pressing tool, the operator must actuate the pneumatic cylinder designed to move the articulated arm intermittently, in such a way that the articulated arm is gradually lifted according to successive steps as the second circle arch of the heel continues to be forced and introduced inside the rim.

Evidently, the good result of the operation depends on the experience and skill of the operator, who must decide when and in which extent the articulated arm must be lifted during the rotation of the heel-pressing tool together with the tyre.

The purpose of the present invention is to devise an improved device for tyre disassembling machines, designed to simplify the assembling of the tyre on the rim, of the type comprising the said articulated arm and a heel-pressing tool, which is also provided with means suitable to determine the gradual automatic lifting of the heel-pressing tool at the correct time, thus relieving the operator from all tasks of check and manual intervention during the tyre assembling operation.

According to the preferred embodiment of the present invention, the said means are of cam and valve train type, integrated in the intermediate articulation point of the said articulated arm.

More precisely, the said intermediate articulation point is realised with a bush with vertical axis, situated at the end of the first section of articulated arm that is articulated according to a vertical axis to a support element with adjustable height. The said bush actuates as hub for the pivoting pin of the second section of articulated arm on which the heel-pressing tool is mounted and slides.

The said pin has an annular groove that is developed for an angle in the centre of about 360° and has a first horizontal section connected with a second inclined section with ascending direction.

The said bush has a radial through hole used to insert and exactly house a bolt that ends with a shaped point designed to be prismatically coupled with the annular groove of the pivoting pin.

It appears evident that, due to the coupling of cam and valve train type, when the second section of articulated arm starts rotation together with the tyre and the heel-pressing tool, the heel-pressing tool maintains its height until the said point is coupled with the first horizontal section of the annular groove, and the heel-pressing tool automatically leaves the said height and starts to gradually rise as soon as the said point is coupled with the second ascending section of the annular groove.

For purposes of clarity, the description of the improved device of the invention continues with reference to the enclosed drawings, which are intended for purposes of illustration only and not in a limiting sense, whereby.

Figure 1:
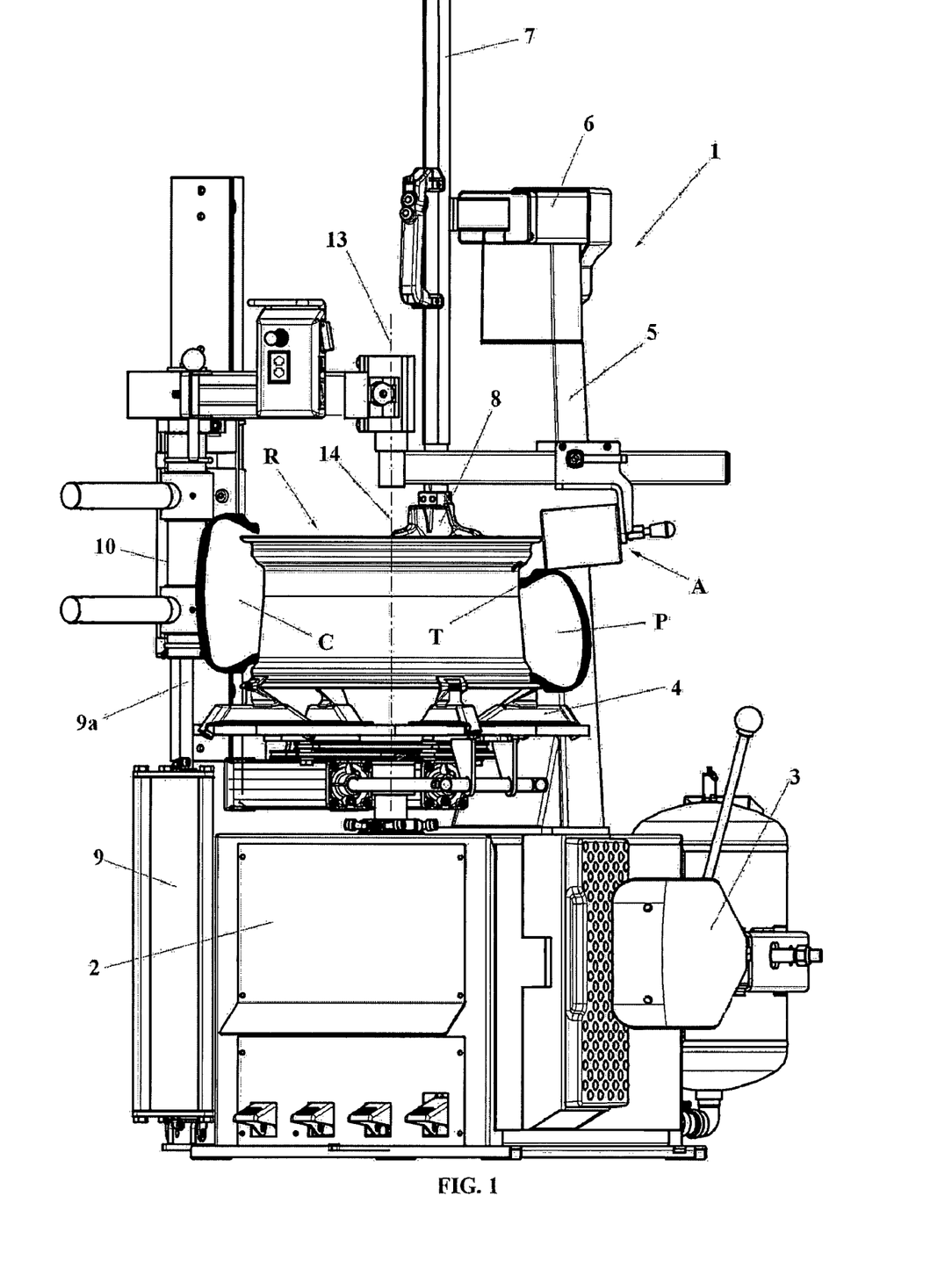
FIG. 1 is a front view of a tyre disassembling machine equipped with the improved device of the invention, in the operating position at the beginning of the assembling operation of the tyre, which is sectioned with a diametral plane passing through the heel-pressing tool.
Figure 2:
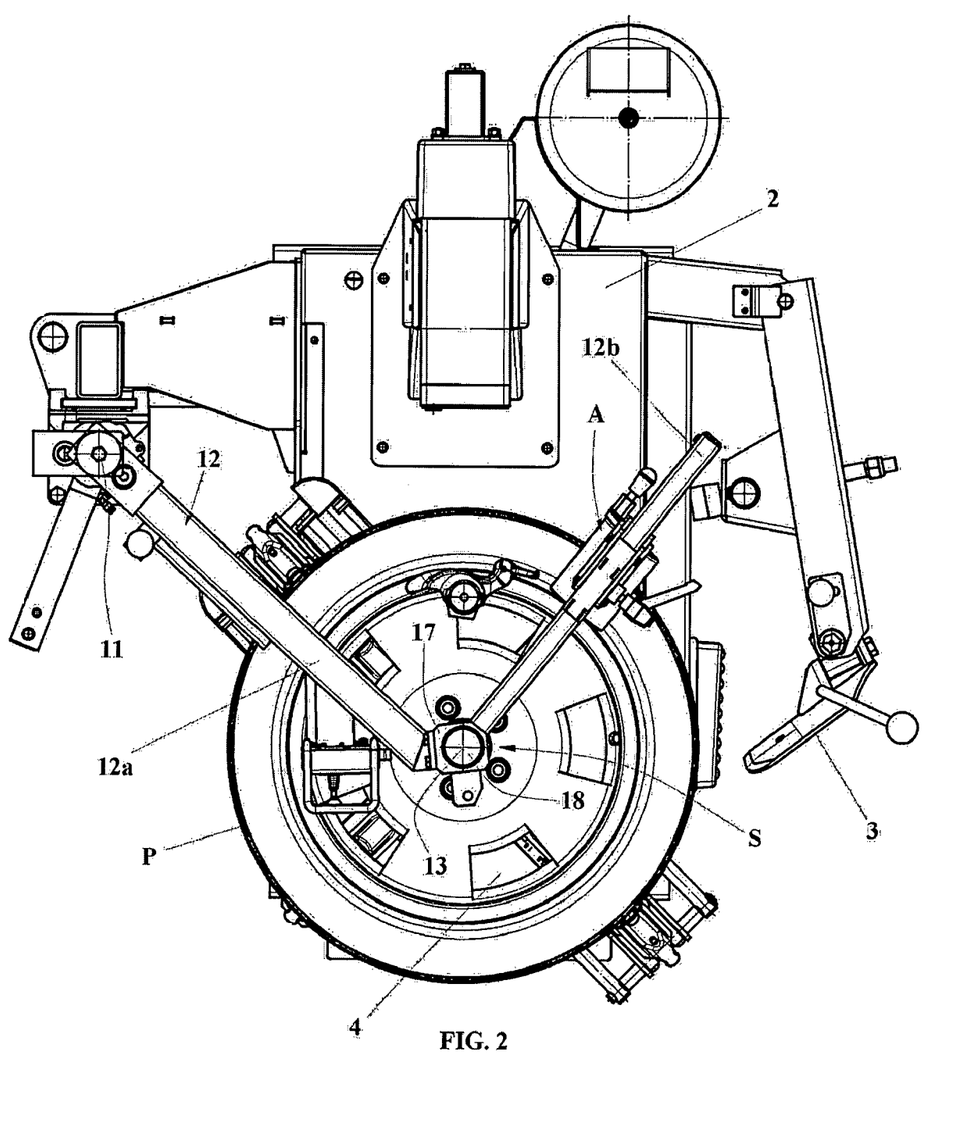
FIG. 2 is the plan view of FIG. 1, showing the angular position of the heel-pressing tool with respect to the rim at the beginning of the assembling operation of the tyre on the rim.
Figure 3:
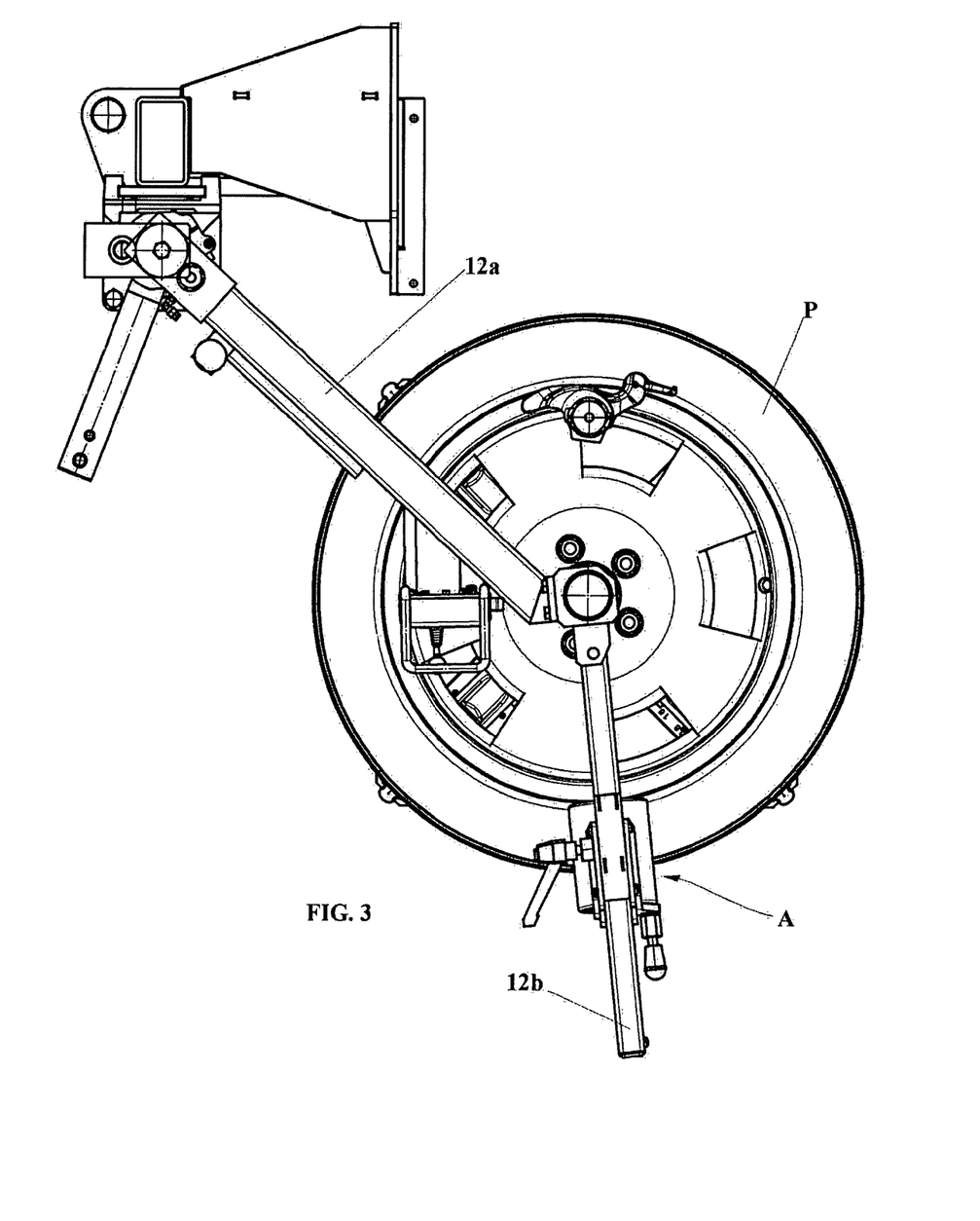
FIGS. 3, 4 and 5 are basically identical to FIG. 2, except for the fact that the base of the machine is not shown for graphic simplification reasons, and for the different angular positions of the heel-pressing tool in its travel with the tyre during the tyre assembling operation.
Figure 4:
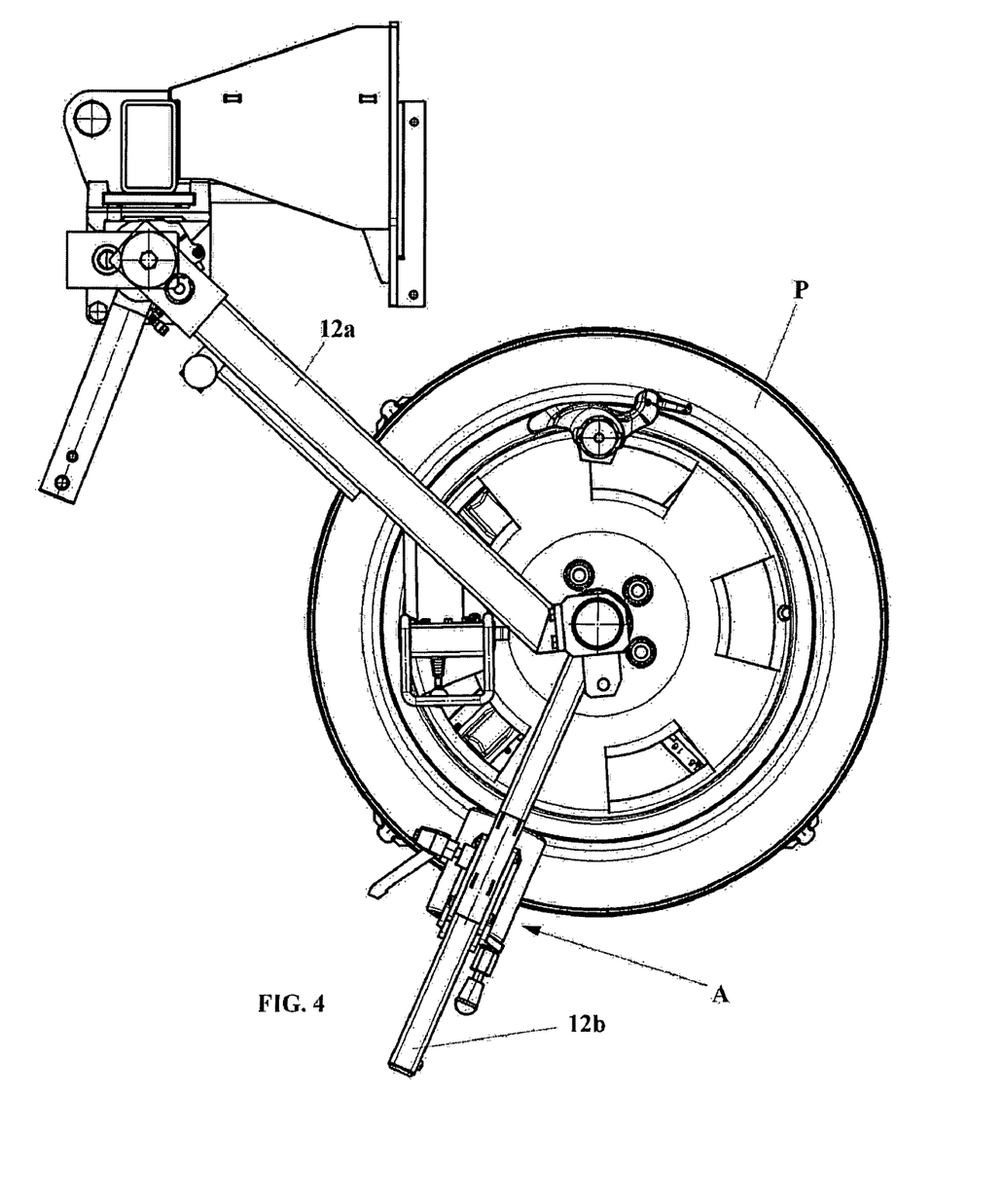
Figure 5:
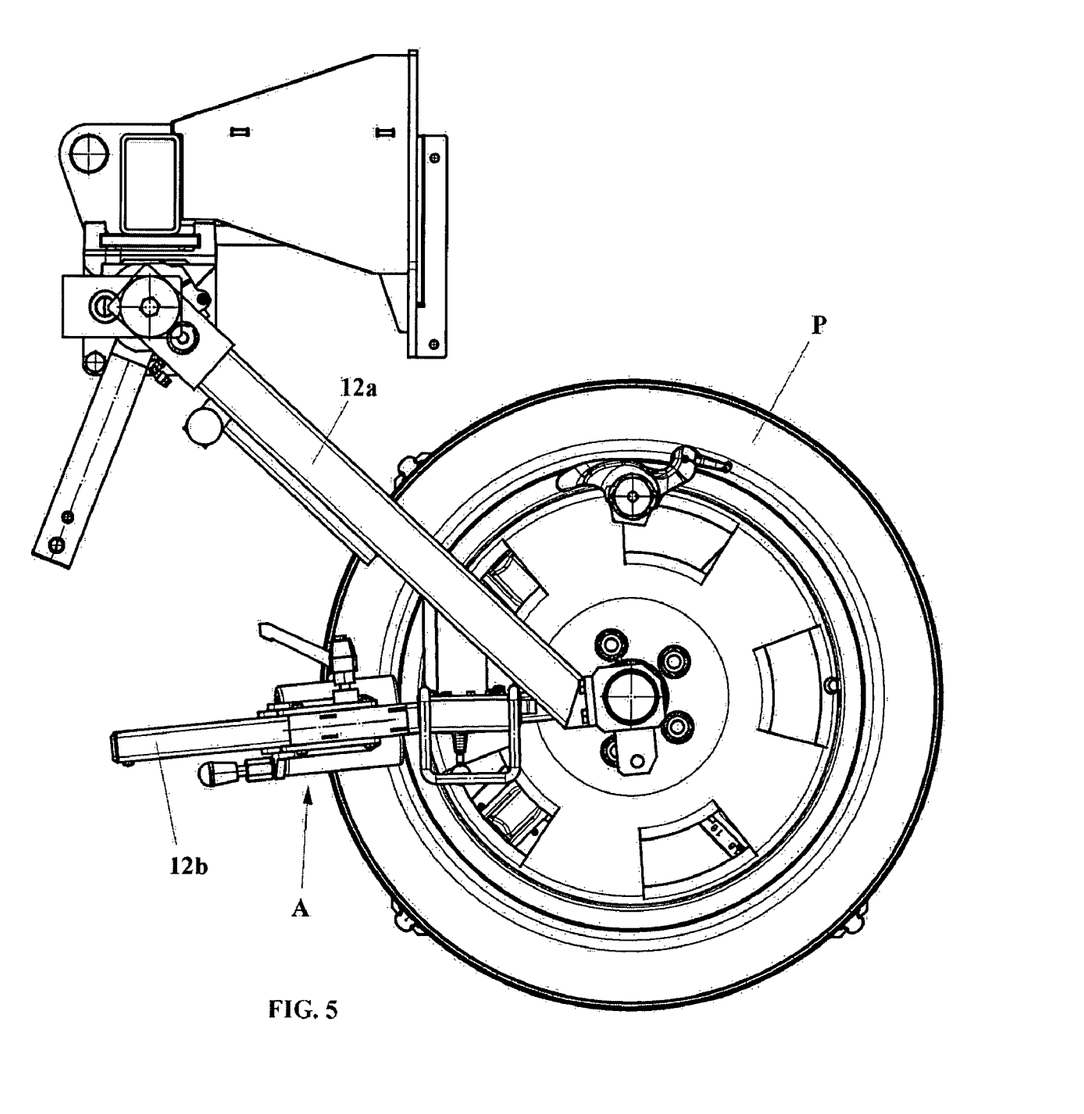

As mentioned in the premise, the improved device of the invention is designed to be mounted on tyre disassembling machines (1) of known type, as the one illustrated in FIG. 1, which basically comprise a base (2), a heel-removing tool (3) situated on the side of the base (2), a self-centring unit (4) used to stop and drive into rotation the wheel (R) during the assembling and disassembling operation of the tyre (P), a fixed column (5) situated behind the base (2) that supports a horizontal projecting arm (6), whose front end is fitted to a sliding rod (7) with vertical axis, with the base used to fit a tool (8) designed to assemble and disassemble the tyre (P) on and from the corresponding rim (C).

According to the known technique, a pneumatic cylinder (9) with vertical axis is fixed on the left-hand side of the tyre disassembling machine (1), with the stem (9a) that drives a slide (10) into alternated vertical travels, on which an articulated arm (12) is articulated with respect to a vertical axis (11), which is formed of a first section (12a) and a second section (12b) that are mutually articulated by means of an joint (S) with vertical axis. (13) placed at a distance from the said axis (11) equal to the distance between the said axis (11) and the rotation axis (14) of the self-centring unit (4), in such a way that the first section (12a) oscillates around its articulation axis (11) until the said axes (13 and 14) are perfectly coaxial and maintained in this position during the entire assembling operation of the tyre (P).

The said articulated arm (12) is adjustable in height because the first section (12a) is fixed to the slide (10).

A heel-pressing tool (A) is mounted on the second section (12b) of the said arm (12), which is preferably composed of a roll (15) supported by a cursor (16) that slides along the second section (12b).

The said cursor (16) is provided with a peg (16a) that can be securely placed in a back position, thus allowing the free rotation of the roll (15) around the support shaft, and in a front position, thus temporarily blocking the said roll (15).

The improved device of the invention is provided with innovative means (M) designed to determine the gradual automatic lifting of the said heel-pressing tool (A) in a predefined point of its rotation next to the tyre (P), during the assembling operation of the tyre on the corresponding rim (C).

According to the preferred embodiment of the invention, the said means (M) are situated in the joint (S) and are of cam and valve train type. More precisely, the said means (M) comprise a bush (17) fixed to the first section (12a) of the articulated arm (12) and a pin (18) fixed to the second section (12b) of the said articulated arm (12).

The said pin (18) has an annular groove (19) that is developed for an angle in the centre of about 360° and has a first horizontal section (19a) connected with a second inclined section (19b) with ascending direction.

The bush (17) designed to house and guide the pivoting pin (18) has a radial hole (20) (see FIG. 9), in which a bolt (21) is inserted and exactly housed, ending with a shaped point (21a) that is prismatically coupled with the annular groove (19) of the pivoting pin.

Figure 6:
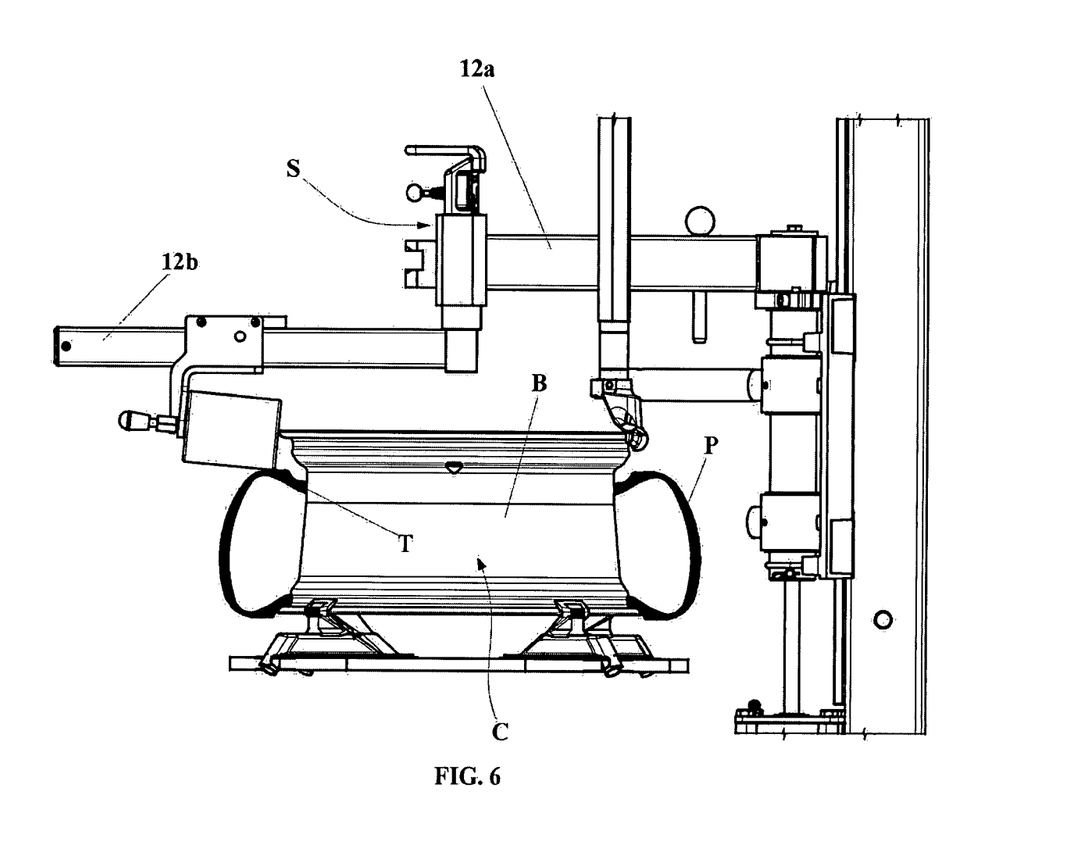
FIGS. 6, 7 and 8 are the elevation views of FIGS. 3, 4 and 5, respectively, in which the tyre is sectioned with a diametral plane passing through the heel-pressing tool, as in FIG. 1.

The first section (19a) is approximately developed along a half circle arch. In view of the above, when the second section (12b) of the articulated arm (12) is driven into rotation together with the tyre (P) and the heel-pressing tool (A), the heel-pressing tool (A) maintains its height until the point (21) is coupled with the first horizontal section (19a) of the annular groove (19), as shown from the comparison of FIGS. 1 and 6, in which, although in two different angular positions staggered by approximately 180°, the heel-pressing tool (A) has the same height that is necessary to compress the upper heel (T) of the tyre (P) down, maintaining it in facing position with respect to the channel (B) of the rim (C), under the demarcation line (L) between the channel (B) and the heel-stopping border (F).

Figure 7:
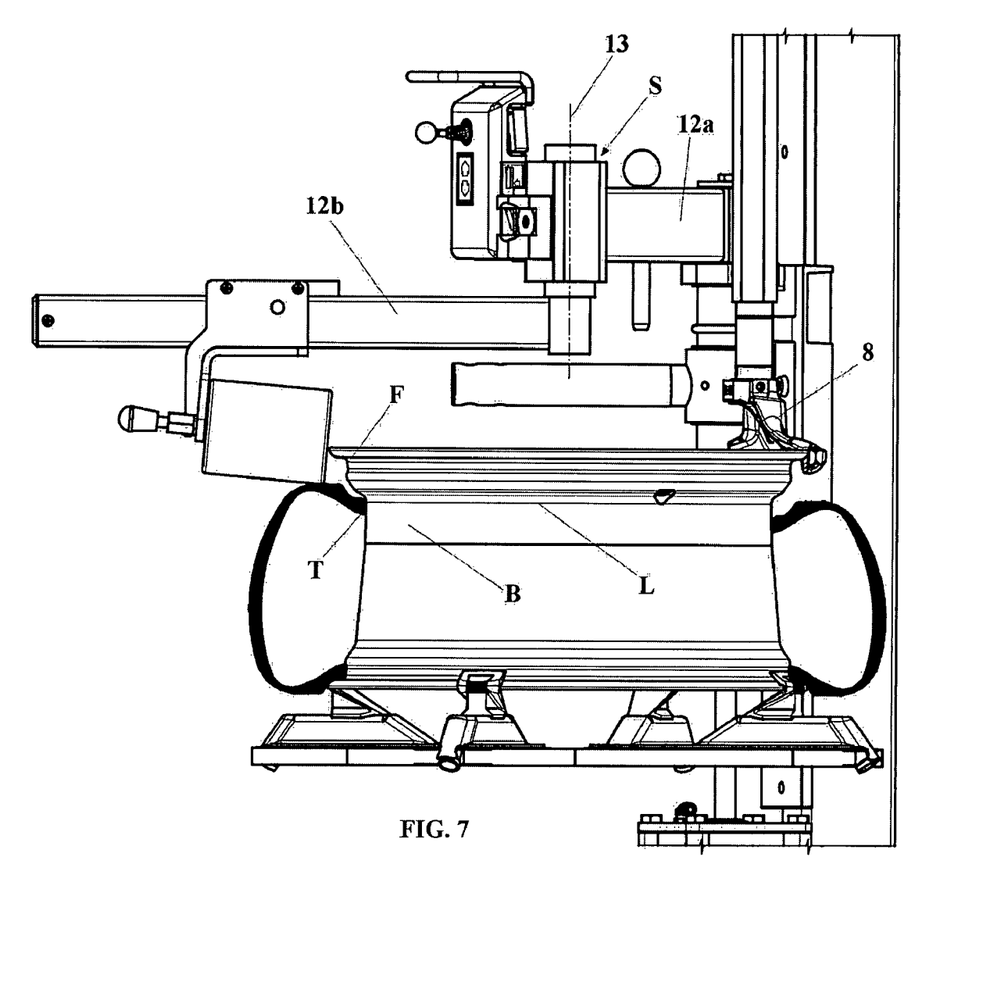
Figure 8:
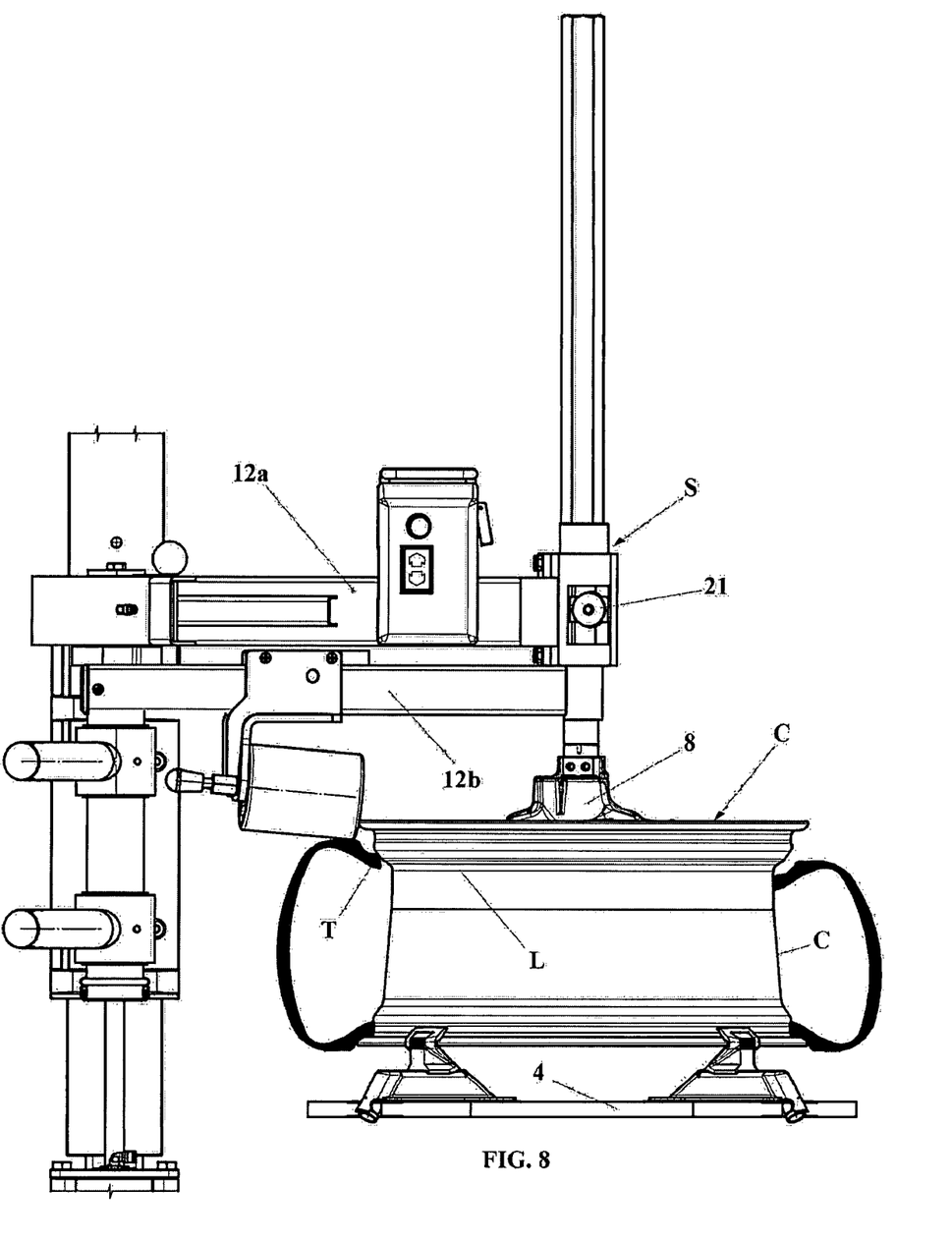

As shown in FIGS. 7 and 8, the heel-pressing tool (A) automatically leaves the said height and starts to rise gradually as soon as the said point (21a) is coupled with the second ascending section (19b) of the annular groove (19). As shown in FIG. 7, the heel-pressing tool (A) has raised, together with the heel (T) that has reached the demarcation line (L) between the channel (B) and the heel-stopping border (F), while in FIG. 8 the heel has gone past the line (L).

Figures 9, 10A, 10B:
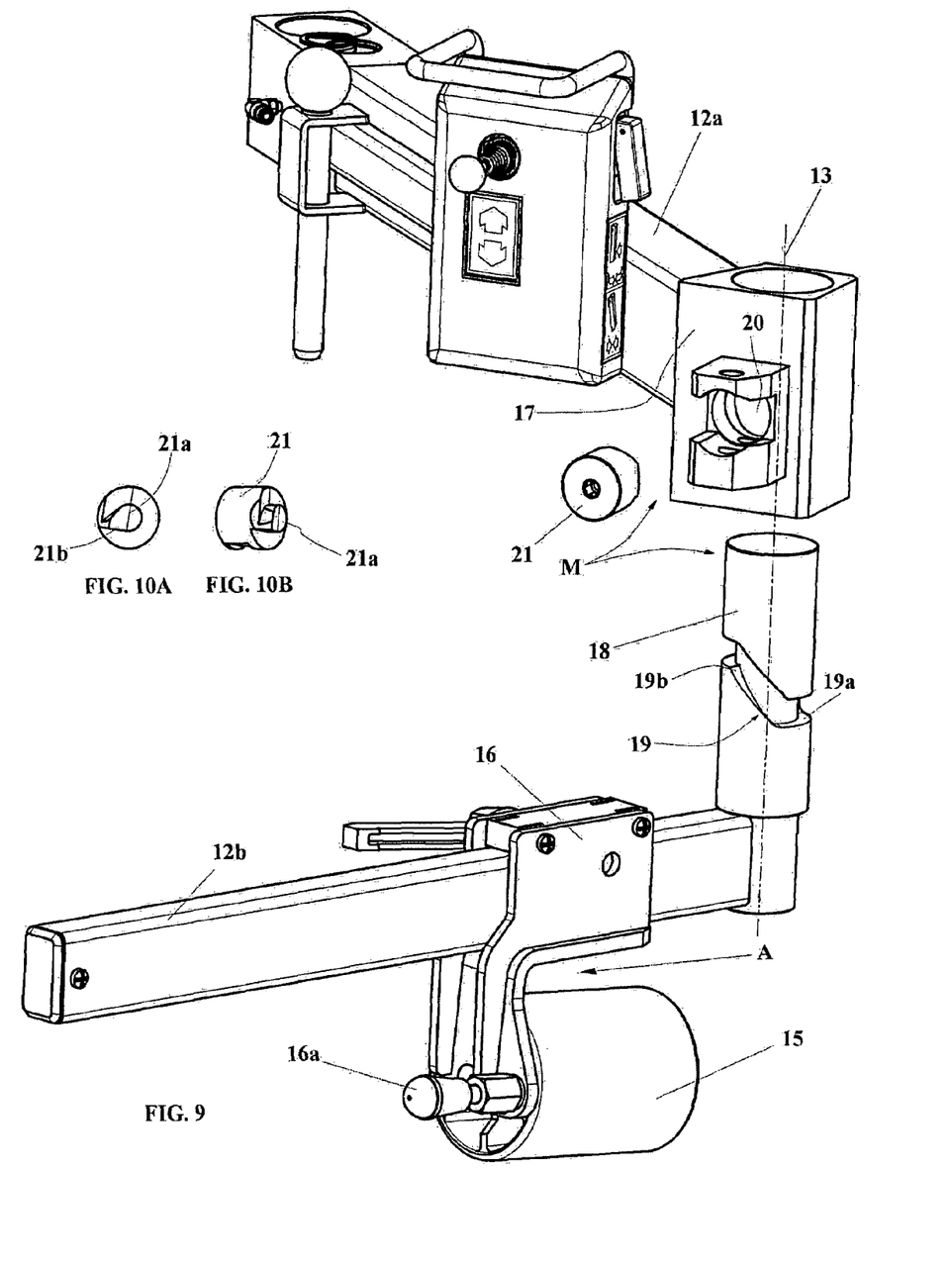
FIG. 9 is an axonometric exploded view of the improved device of the invention.
FIGS. 10A and 10B show the same constructive detail seen from different angles.

FIG. 10A shows the shaped profile of the point (21a), which is characterised by a flat side (21b) designed to reduce pressure between rubbing surfaces during the rotation of the pin (18) inside the bush (19).

The invention claimed is:

1. Improved device for tire disassembling machines (1) designed to simplify tire assembling without excessive stretching, which comprises: a base (2), a self-centering unit (4) rotatably mounted on the base (2) around a rotation axis (14), to stop and drive into rotation, a wheel (R) comprising a tire (P) mounted on a corresponding rim (C), an articulated arm (12) composed of a first section (12a) articulated according to a first vertical axis (11) and a support side (10) with adjustable height with respect to the base (2) of the tire disassembling machine (1), and a second section (12b) with a sliding heel-pressing tool (A) articulated with the first section (12a) by means of a joint (S) with a second vertical axis (13) placed at a distance from the said first vertical axis (11) equal to the distance between the said first vertical axis (11) and the rotation axis (14) of a self-centering unit (4), wherein said second section (12) of the arm rotates around said second vertical axis (13) so that the heel-pressing tool (A) rotates together with the tire (P), further having cam and valve train means (M) designed to determine the gradual automatic lifting of the said heel-pressing tool (A) in a predefined point of its rotation together with the tire (P), during the assembling operation of the tire on the corresponding rim (C).

2. Device of claim 1 characterized by the fact that the said means (M) are positioned in the joint (S).

3. Device of claim 1 characterized by the fact that the said means (M) comprise a brush (17) fixed to the first section (12a) of the articulated arm (12) and a pin (18) fixed to the second section (12b) of the articulated arm (12), with the pin (18) being provided with an annular groove (19), and the bush (17) being provided with a radial hole (20) in which a bolt (21) is inserted and exactly housed, ending with a point (21a) designed to be prismatically coupled with the annular groove (19) of the pivoting pin (18).

4. Device of claim 3 characterized by the fact that the groove (19) is developed for an angle in the centre of approximately 360°.

5. Device of claim 3 characterized by the fact that the said groove (19) has a first section (19*a*) with horizontal direction connected to a second inclined section (19*b*) with ascending direction.

6. Device of claim 5 characterized by the fact that the first section (19*a*) of the groove (19) develops for approximately a half circle arch.

7. Device as claimed in claim 1, characterized by the fact that the heel-pressing tool (A) consists in a roll (15) supported by a cursor (16) that slides along the second section (12*b*), in which the said cursor (16) is provided with a peg (16*a*) that can be securely placed in a back position, thus allowing the free rotation of the roll (15) around the support shaft, and in a front position, thus temporarily blocking the said roll (15).

* * * * *